(12) United States Patent
Lee et al.

(10) Patent No.: US 12,543,903 B2
(45) Date of Patent: Feb. 10, 2026

(54) ROBOT CLEANER

(71) Applicant: LG ELECTRONICS INC., Seoul (KR)

(72) Inventors: Seungjin Lee, Seoul (KR); Hwang Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 916 days.

(21) Appl. No.: 17/762,415

(22) PCT Filed: Oct. 2, 2019

(86) PCT No.: PCT/KR2019/012924
§ 371 (c)(1),
(2) Date: Mar. 22, 2022

(87) PCT Pub. No.: WO2021/066224
PCT Pub. Date: Apr. 8, 2021

(65) Prior Publication Data
US 2022/0386833 A1 Dec. 8, 2022

(51) Int. Cl.
*A47L 9/00* (2006.01)
*A47L 11/40* (2006.01)
*B60B 33/00* (2006.01)

(52) U.S. Cl.
CPC ........... *A47L 9/009* (2013.01); *A47L 11/4072* (2013.01); *B60B 33/0026* (2013.01); *B60B 33/0039* (2013.01); *B60B 33/0068* (2013.01); *B60B 33/0073* (2013.01); *A47L 2201/00* (2013.01)

(58) Field of Classification Search
CPC .. A47L 9/009; A47L 11/4072; A47L 2201/00; B60B 33/0026; B60B 33/0039; B60B 33/0068; B60B 33/0073
See application file for complete search history.

(56) References Cited

U.S. PATENT DOCUMENTS

| | | | |
|---|---|---|---|
| 3,978,936 A * | 9/1976 | Schwartz | B62M 6/90 180/342 |
| 4,515,235 A | 5/1985 | Yamamoto et al. | |
| 4,763,910 A * | 8/1988 | Brandli | B60B 33/045 280/47.16 |
| 5,052,705 A * | 10/1991 | Ringle | B62M 23/00 74/423 |

(Continued)

FOREIGN PATENT DOCUMENTS

| | | |
|---|---|---|
| CN | 203282967 | 11/2013 |
| JP | 2016-506788 | 3/2016 |

(Continued)

OTHER PUBLICATIONS

Korean Notice of Allowance dated Jan. 30, 2024 issued in Application No. 10-2022-7007221.

(Continued)

*Primary Examiner* — Valentin Neacsu
*Assistant Examiner* — Michael R Stabley
(74) *Attorney, Agent, or Firm* — KED & ASSOCIATES

(57) ABSTRACT

The present disclosure relates to a robot cleaner, more particularly, to a robot cleaner that may rotate auxiliary wheels to run over a tilted route or an obstacle, when cannot run over a tilted route or an obstacle because main wheels are not contacting with the floor.

12 Claims, 7 Drawing Sheets

(56) References Cited

U.S. PATENT DOCUMENTS

| | | | | |
|---|---|---|---|---|
| 6,668,965 | B2* | 12/2003 | Strong | B62D 31/003 |
| | | | | 16/35 R |
| 7,673,710 | B2* | 3/2010 | Lee | B25J 5/007 |
| | | | | 280/755 |
| 7,721,829 | B2* | 5/2010 | Lee | B62D 61/12 |
| | | | | 180/6.48 |
| 8,292,327 | B2* | 10/2012 | Araya Moreno | B60B 33/025 |
| | | | | 280/771 |
| 8,998,215 | B2* | 4/2015 | Windorfer | B60B 15/18 |
| | | | | 280/5.2 |
| 9,775,476 | B2* | 10/2017 | Jang | A47L 9/009 |
| 9,883,778 | B2* | 2/2018 | Vanderstegen-Drake | |
| | | | | A47L 9/009 |
| 9,950,586 | B2* | 4/2018 | Park | A47L 11/4066 |
| 10,167,050 | B2* | 1/2019 | Olsommer | B62M 6/50 |
| 10,710,404 | B2* | 7/2020 | Wiley | B60B 33/0078 |
| 2007/0137905 | A1 | 6/2007 | Lee et al. | |
| 2011/0232985 | A1* | 9/2011 | Lee | B62M 6/45 |
| | | | | 180/297 |
| 2017/0001490 | A1 | 1/2017 | Park et al. | |
| 2019/0193784 | A1* | 6/2019 | Wach | B60B 33/0049 |
| 2022/0369549 | A1* | 11/2022 | Baker | B60K 7/0007 |

FOREIGN PATENT DOCUMENTS

| | | |
|---|---|---|
| KR | 10-2006-0014716 | 2/2006 |
| KR | 10-0670202 | 1/2007 |
| KR | 10-2009-0054651 | 6/2009 |
| KR | 10-1424398 | 7/2014 |

OTHER PUBLICATIONS

International Search Report and Written Opinion dated Jul. 1, 2020 issued in Application No. PCT/KR2019/012924.
Korean Office Action issued in Application No. 10-2022-7007221 dated Nov. 27, 2023.

* cited by examiner

【FIG. 1】
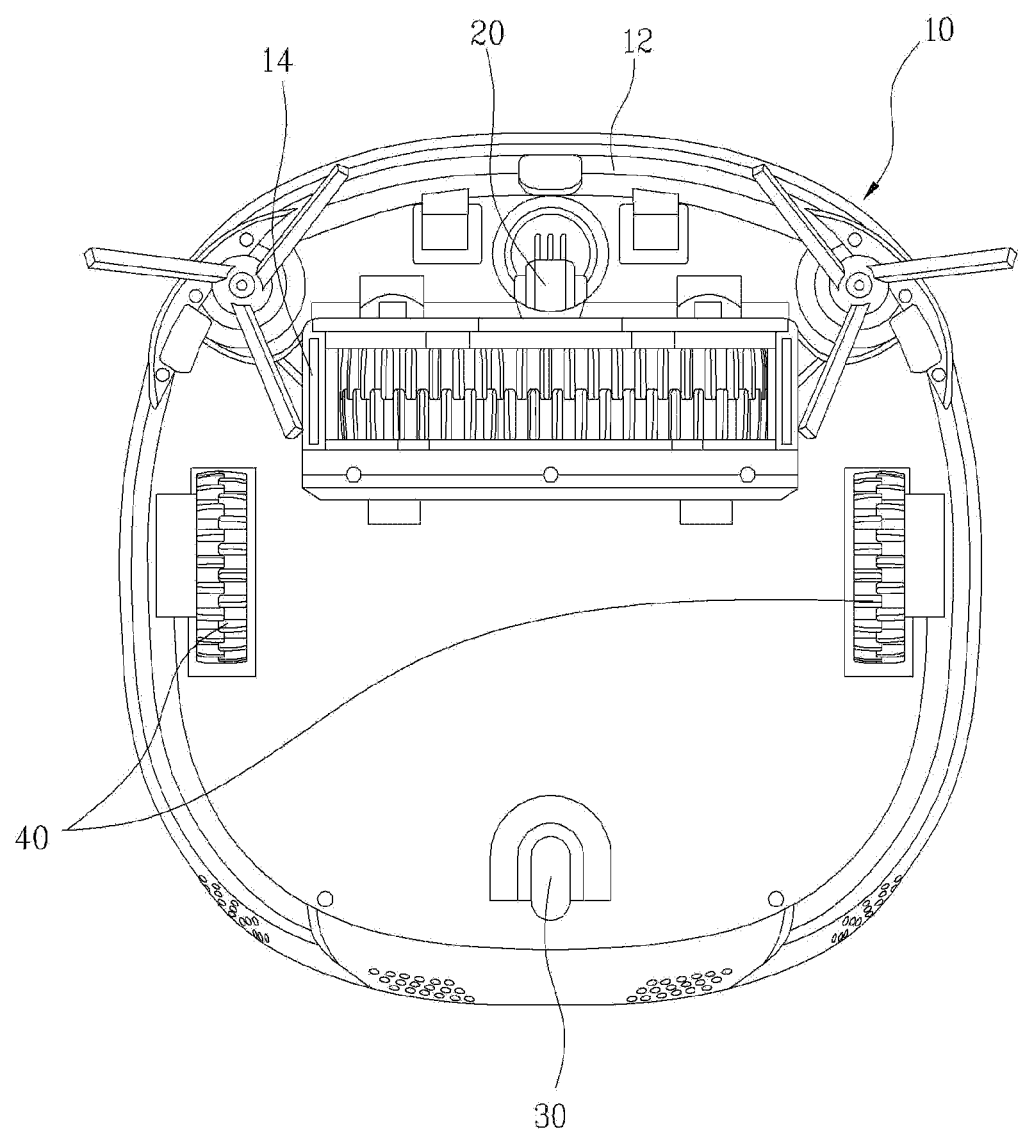

[FIG. 2]
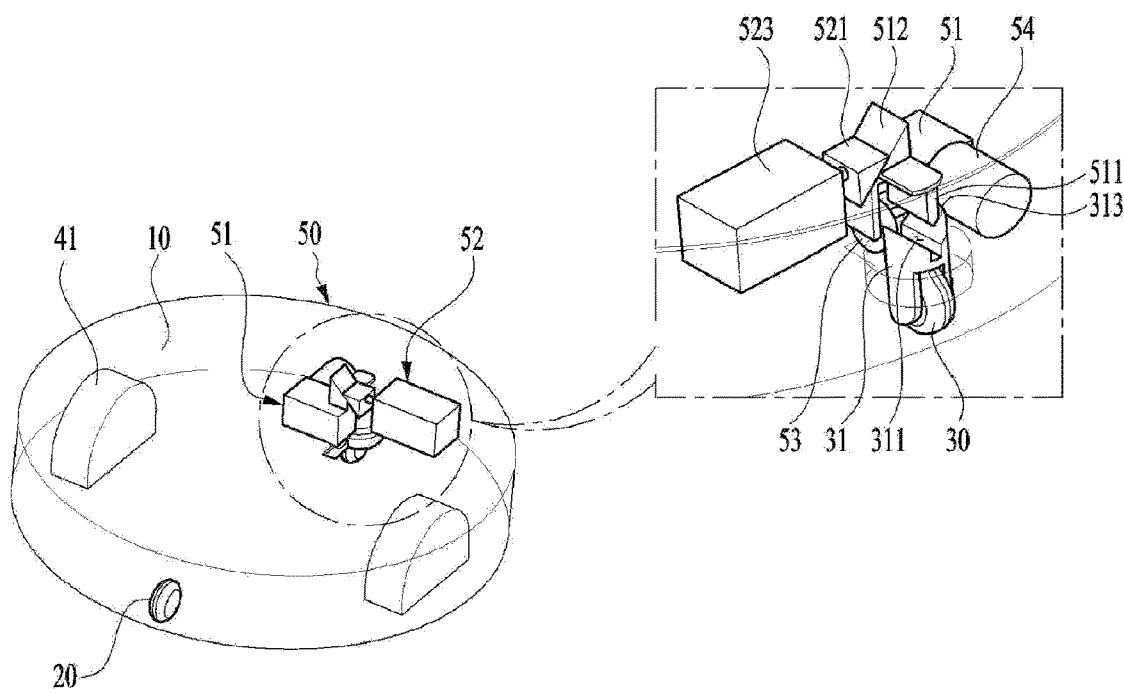

[FIG. 3]
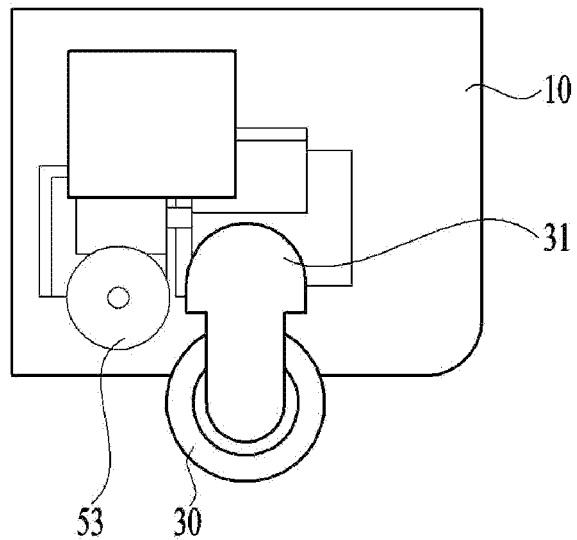

[FIG. 4]
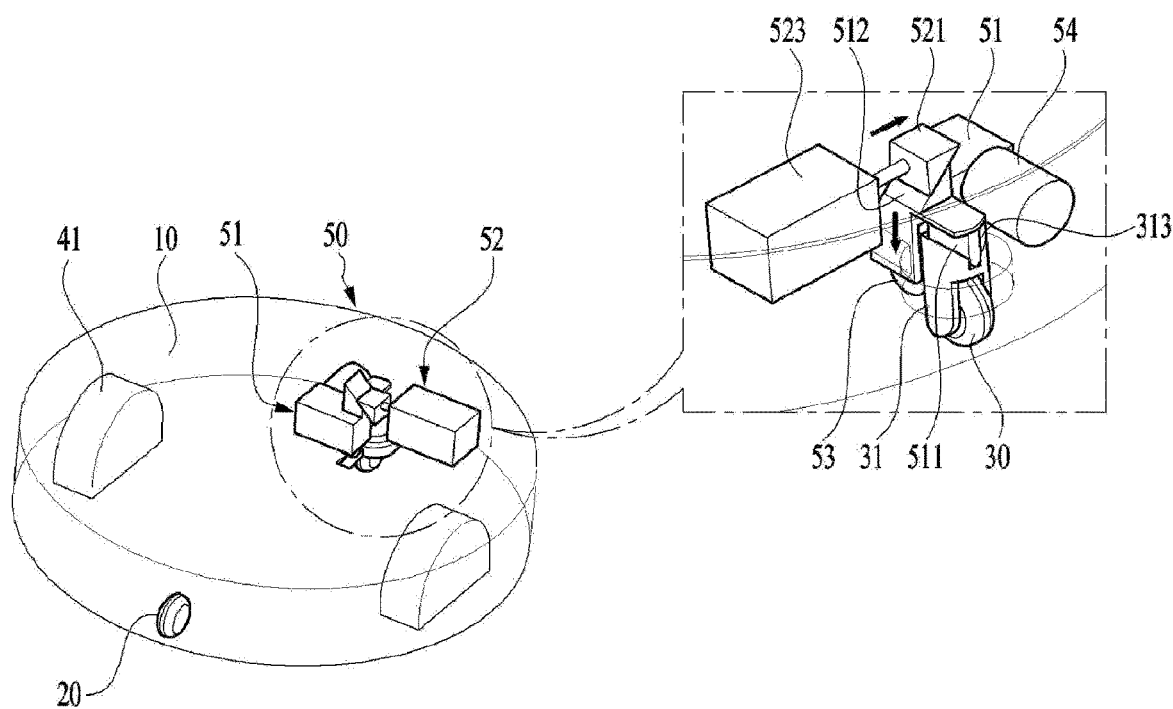

[FIG. 5]
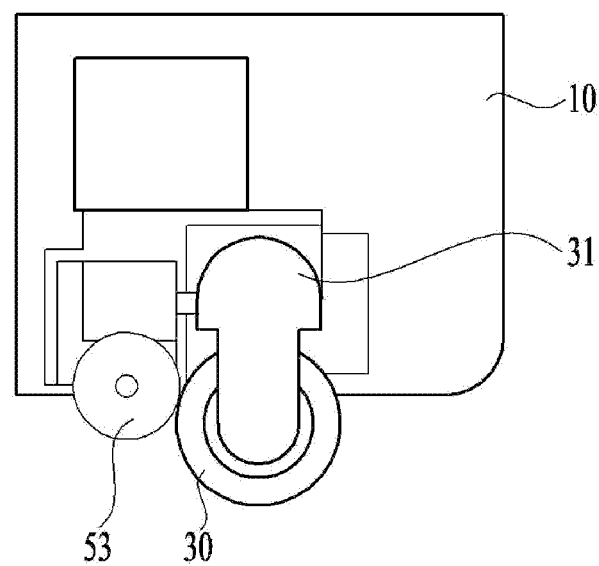

[FIG. 6]
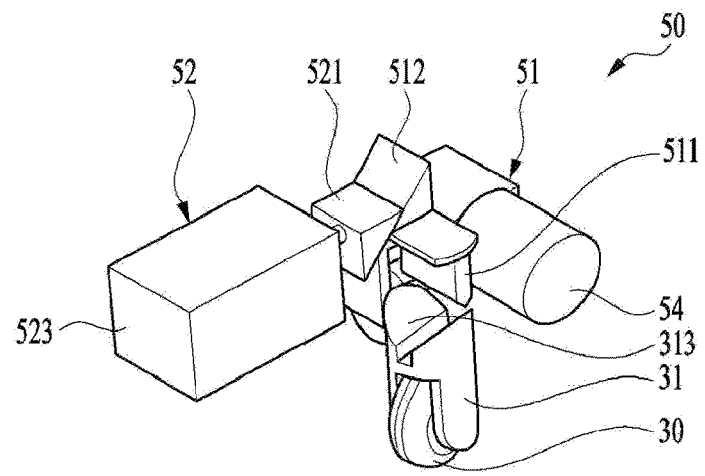
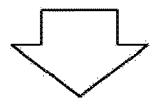
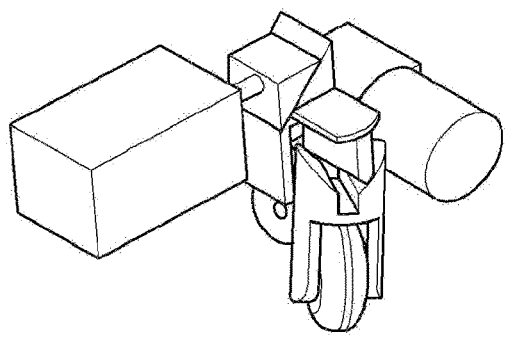
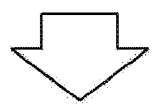
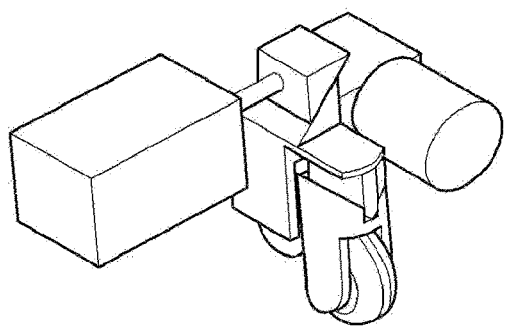

[FIG. 7]
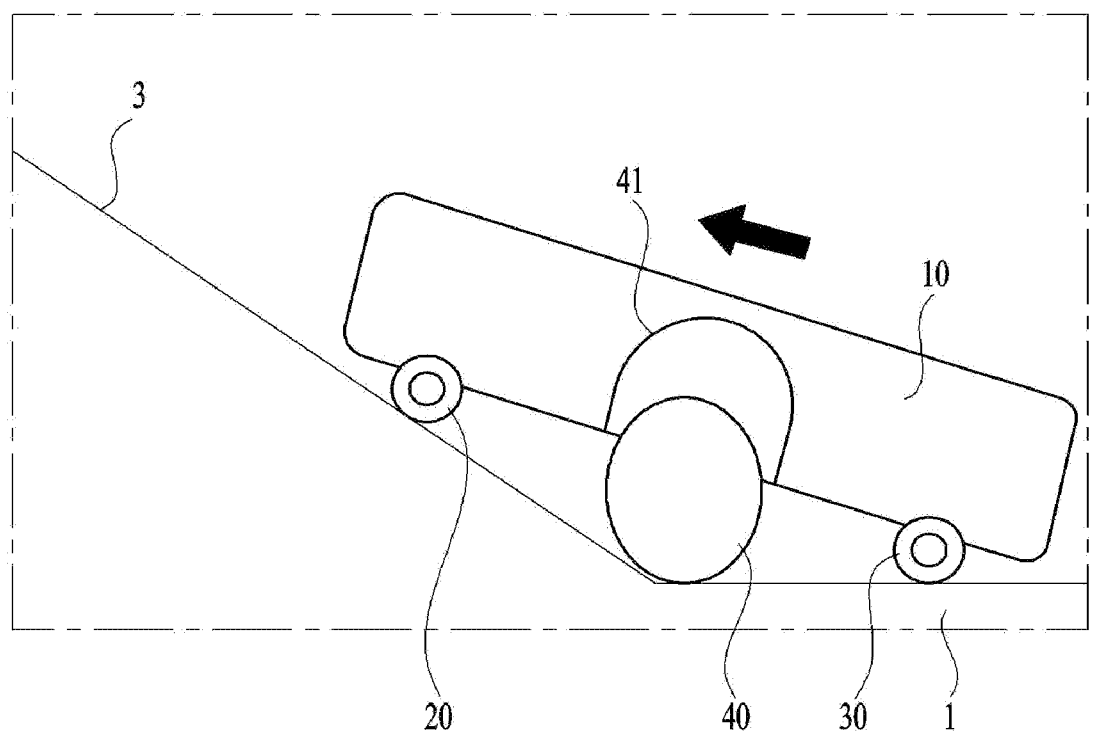

ROBOT CLEANER

CROSS-REFERENCE TO RELATED PATENT APPLICATIONS

This application is a U.S. National Stage Application under 35 U.S.C. § 371 of PCT Application No. PCT/KR2019/012924, filed Oct. 2, 2019, whose entire disclosures are hereby incorporated by reference.

TECHNICAL FIELD

Embodiments of the present disclosure relate to a robot cleaner configured to perform cleaning by sucking dust, dirt and foreign substances while running on the floor automatically.

BACKGROUND ART

Generally, a vacuum cleaner includes a body having a suction device and a dust canister; and a cleaner nozzle used in cleaning the floor in a state of being adjacent to the floor that is a cleaning object.

The vacuum cleaner is categorized into a hand-operated cleaner used by a user in cleaning the floor with the hand and a robot cleaner configured to perform cleaning while running on the floor automatically.

In the hand-operated cleaner, the suction device is actuated to generate a suction force by using a driving force of an electric motor and the user puts the cleaner nozzle or the body on the floor, in a state of holding the body. In this instance, the cleaner nozzle sucks first and foreign substances from the floor by means of the suction force and the sucked foreign substances are collected in the dust canister to perform cleaning.

The robot cleaner is configured to suck dust and other foreign substances from the floor while running in an area desired to clean automatically. In other words, the robot cleaner may perform cleaning for a predetermined area automatically. For that, the robot cleaner includes a distance sensor configured to sense a distance to an obstacle installed in a cleaning area (e.g., furniture, office tools, wall or the like); and right and left wheels for the movement of the robot cleaner. Here, the right and left wheels may be configured to be rotated by right and left motors such that the rotor cleaner can perform cleaning, while robot cleaner is changing its direction automatically according to according to the drive of the right and left motors.

In addition, a suction nozzle is provided in a lower portion of the robot cleaner and configured to suck foreign substances from the floor. The suction nozzle may include a nozzle case fixed to the cleaner body not to move; a suction hole formed in a bottom of the nozzle case and configured to suck the foreign substances; and an agitator rotatably coupled to the suction hole and configured to lift the foreign substances including dust that are stuck on the floor to the suction hole.

When the height of the obstacle such as a threshold existing in the cleaning area is larger than the preset height determined to allow the robot cleaner to climb up, the wheels of the cleaner body could fail to run over the obstacle.

When the robot cleaner run over a titled surface, the wheels arranged in right and left sides of the robot cleaner are not likely to contact with the floor and idle.

While the robot cleaner is trapped, the wheels are caught at the obstacle and the motor is being rotated continuously. Accordingly, the wheels might damage or the battery provided in the robot cleaner might be consumed faster.

Korean Patent Open Paid No. 10-2014-0067705 (published on 5 Jun. 2014, hereinafter, Cited Reference) discloses a moving auxiliary device 200 for running over an obstacle such as a threshold, the moving auxiliary device 200 include a second drive unit 210, a moving member 230 supplied electric power by the second drive unit 210, a power transmission unit 220 provided to transfer the power of the second drive unit 210 to the moving member 230, and a housing 201 for accommodating the power transmission unit 220.

Specifically, the cited reference is a swing suspension type which requires an additional motor and an additional sensor configured to sense that the wheels of the robot cleaner are caught (or the wheels are lifted from the floor), such that it may require additional control method configured to be driven after the caught state of the wheels. Accordingly, the cited reference has disadvantages of complex technical features and structure.

DISCLOSURE OF INVENTION

Technical Problem

To overcome the disadvantages, an object of the present disclosure is to address the above-noted and other problems.

Another object of the present disclosure is to provide a robot cleaner that may run over an obstacle by aligning and rotating casters in a running direction of the robot cleaner, when it runs over a tilted route or obstacle.

A further object of the present disclosure is to provide a structure of a robot cleaner configured to align the caster rotating 360 degrees in the running direction of the robot cleaner and transfer power to the caster.

A still further object of the present disclosure is to provide a robot cleaner that may run over the tilted route or obstacle by transferring power to a caster configured to assist rotation of a body and rotating the caster, without additional structures for running over the obstacle.

Solution to Problem

To achieve these objects and other advantages and in accordance with the purpose of the embodiments, as embodied and broadly described herein, main driving wheels provided in a robot cleaner are provided in both areas with respect to a center area of the robot cleaner, respectively, and casters are provided in front and rear sides of the robot cleaner. When the robot cleaner climbs up a tilted route or an obstacle, the power of the suspension is not sufficient and the main driving wheels might be idling. In this instance, a rear caster may be driven for the robot cleaner to climb up the tilted route and the obstacle.

Furthermore, the auxiliary wheels may function as the casters when the robot cleaner is running and assist the running of the robot cleaning. When the robot cleaner runs over the tilted route, the auxiliary wheels may be driven to facilitate the running over of the robot cleaner.

Embodiments of the present disclosure may provide a robot cleaner comprising a body; auxiliary wheels arranged in front and rear sides of the body; main wheels arranged between the auxiliary wheels; and a transfer unit configured to supply power to the auxiliary wheels selectively, wherein the transfer unit rotates the auxiliary wheels by selectively contacting with the auxiliary wheels.

The auxiliary wheels may be supplied the power by the transfer unit, independent from the main wheels.

The transfer unit may comprise a rotation member rotatable by contacting with the auxiliary wheels and configured to rotate the auxiliary wheels; a motor configured to providing the power to the rotation member; and a first member connected with the rotation member and the motor and configured to selectively contacting with the auxiliary wheels and the first member and configured to selectively contacting the auxiliary wheels and the rotation member by moving with respect to the body vertically. The auxiliary wheels may comprise a fixing member configured to form a rotational shaft of the auxiliary wheel and comprising a groove, and the first member comprises a projection inserted in the groove.

The fixing member may further comprise a guide portion forming a tilted surface towards the groove from both sides of the fixing member, wherein the projection is inserted in the groove along the guide portion and aligns a rotational axis of the auxiliary wheels and a rotational axis of the rotation member in parallel with each other.

The transfer unit may further comprise a second member contacting with the first member and moving the first member vertically. The second member may comprise a first contact member horizontally moving with respect to the body, and the first member may be vertically moved with respect to the body along with the horizontal movement the first contact portion. The first contact portion may form a tilted surface, and the first member may comprise a second contact portion forming a tilted surface that engages with the tilted surface of the first contact portion.

Embodiments of the present disclosure may also provide a robot cleaner comprising a body; auxiliary wheels arranged in front and rear sides of the body; main wheels arranged between the auxiliary wheels; and a fixing member forming a rotational axes of the auxiliary wheels and rotatable with respect to the body; and a transfer unit configured to supply power to the auxiliary wheels selectively, wherein the transfer unit rotates the auxiliary wheels by selectively coupled to the fixing member and configured to align the auxiliary wheels in a running direction of the body.

The transfer unit may comprise a first module vertically moved with respect to the body and comprising a projection, and the fixing member may comprise a guide portion having a groove having the projection inserted therein. The fixing member may further comprise a guide portion forming a tilted surface towards the groove from both sides of the fixing member. The first module may be vertically moved with respect to the body, and as the projection is inserted in the groove along the tilted surface, the first module may fixedly align the auxiliary wheels in a running direction of the body.

The first module may comprise a rotation member rotatable by contacting with the auxiliary wheels and configured to rotate the auxiliary wheels; a motor configured to providing the power to the rotation member; and a first member comprising the projection connected with the rotation member and the motor and the rotation member by moving with respect to the body vertically.

The transfer unit may further comprise a second module contacting with the first module and moving the first module vertically. The second module may be horizontally moved with respect to the body, and the first module may be vertically moved with respect to the body along with the horizontal movement of the second module.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

Advantageous Effects of Invention

Accordingly, the embodiments have following advantageous effects. According to the embodiments of the present disclosure, the robot cleaner is capable of running over an obstacle by aligning and rotating casters in a running direction of the robot cleaner, when it runs over a tilted route or obstacle.

Furthermore, the robot cleaner is capable of running over the tilted route or obstacle by transferring power to a caster configured to assist rotation of a body and rotating the caster, without additional structures for running over the obstacle.

Still further, the caster may be freely rotatable in a horizontal direction of the robot cleaner running on the floor and configured to assist the running of the robot cleaner. When the robot cleaner is running over the tilted surface of the obstacle, the caster may be aligned in the running direction of the robot cleaner

BRIEF DESCRIPTION OF DRAWINGS

FIG. 1 is a diagram illustrating a lower surface of a robot cleaner according to one embodiment of the present disclosure;

FIG. 2 is a diagram illustrating an auxiliary wheel when the robot cleaner is running;

FIG. 3 is a side perspective view of FIG. 2;

FIG. 4 is a diagram illustrating an auxiliary wheel when the robot cleaner is running over;

FIG. 5 is a side perspective view of FIG. 4;

FIG. 6 is a diagram illustrating an auxiliary wheel power transfer module provided in the robot cleaner according to one embodiment; and FIG. 7 is a diagram illustrating one example of climbing that is performed by the robot cleaner according to one embodiment.

MODE FOR THE INVENTION

Reference will now be made in detail to the preferred embodiments of the present disclosure, examples of which are illustrated in the accompanying drawings. All terms disclosed in this specification correspond to general terms understood by persons having ordinary skill in the art to which the present disclosure pertains unless the terms are specially defined. If the terms disclosed in this specification conflict with general terms, the terms may be understood on the basis of their meanings as used in this specification.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

It will be understood that although the terms first, second, A, B, (a), (b), etc. may be used herein to describe various elements, these elements should not be limited by these terms. These terms are generally only used to distinguish one element from another.

FIG. 1 is a diagram illustrating a lower surface of a robot cleaner according to one embodiment of the present disclosure. Hereinafter, referring to FIG. 1, the embodiment will be described.

The robot cleaner according to this embodiment may include a body 10 defining an exterior design; a wheel 40 coupled to the body 10 and configured to rotate to move or rotate the body 10 back and forth; and a front auxiliary wheel 20 supporting one side of the body 10 and assisting the rotation of the body 10 facilitated by the wheel 40.

The wheel 40 may include right and left wheels independently provided in right and left sides of the body 10 and configured to be independently driven.

When the body 10 is running forwardly and backwardly, the wheels 40 may be rotated in the same direction. When the body 10 is rotated, the wheels 40 may be rotated in different directions.

The rotation of the body 10 may be performed to change the running direction of the robot cleaner. As one example, when the body 10 is blocked by a high obstacle not to run forwardly, the case 10 may be rotated to change the running direction.

Meanwhile, the body 10 may include a suction unit 14 configured to suck foreign substances; and a tilted unit 12 configured to guide the body 10 when the body 10 is running over a step. The tilted unit 12 may be formed in a front lower end of the case 10 and it may mean a tilted part.

The suction unit 14 may include an agitator provided in the body 10 and configured to contact with the floor on which cleaning is performed; and a suction hole formed in the body 10 and configured to suck external foreign substances by means of a suction force generated in the body 10.

The tilted unit 12 may be arranged in a front end of the body 10 and the auxiliary wheel 20 may be arranged behind the tilted unit 12. The wheels 40 may be arranged behind the front auxiliary wheel 20.

Meanwhile, a rear auxiliary wheel 30 may be provided behind the wheels 40 to support the other side of the body 10.

The front auxiliary wheel 20 and the rear auxiliary wheel 30 may freely rotate with respect to the body 10 in a horizontal direction. The front auxiliary wheel 20 and the rear auxiliary wheel 30 may be fixedly coupled to the body 10 at a preset height.

Meanwhile, the wheels 40 may be configured of two wheels. The two wheels may be rotated at different speeds or in different directions so as to rotate the body 10 leftwards or rightwards.

Especially, the wheels 40 may have a variable height with respect to the body 10, different from the front auxiliary wheel 20 having the fixed height.

FIG. 2 is a diagram illustrating an auxiliary wheel when the robot cleaner is running and FIG. 3 is a side perspective view of FIG. 2. Hereinafter, the auxiliary wheel will be described referring to FIGS. 2 and 3.

The robot cleaner according to the present embodiment may include a body 10; auxiliary wheels 20 and 30 provided in front and rear sides of the body 10; and a transfer unit 50 configured to provide power to the auxiliary wheels selectively. The transfer unit 50 may rotate the auxiliary wheels by selective contact with the auxiliary wheels.

The auxiliary wheels may include a front auxiliary wheel 20 arranged in a front side of the body 10; and a rear auxiliary wheel 30 arranged in a rear side of the body 10. The front and rear directions may be determined based on a running direction in which the body 10 is cleaning the floor.

It is possible to move the body 10 forwardly and backwardly. However, during the cleaning, the body is running with a front area having the suction hole 14 being directed forwards such that the front auxiliary wheel 20 may be provided adjacent to the suction unit 14 at a lower surface of the body 10. The rear auxiliary wheel 30 may be provided in opposite to the front auxiliary wheel 20.

Hereinafter, the auxiliary wheel may indicate the rear auxiliary wheel 30 selectively supplied the power by the transfer unit 50. The transfer unit 50 may be provided even in the front auxiliary wheel 20 according to a user's selection. In this instance, the configuration and characteristics of the transfer unit 50 may be equal to those of the transfer unit 50 selectively supplying power to the rear auxiliary wheel 30 which will be described later.

The rear auxiliary wheel 30 may be selectively supplied the power by the transfer unit 50, independent from a main wheel 40. As mentioned above, the main wheels 40 may have motors, respectively, to be driven in the right and left sides of the body 10. Alternatively, the transfer unit 50 may include an auxiliary motor to provide power to the auxiliary wheels 30, different from the motor configured to provide the power to the main wheels 40.

The transfer unit 50 may include a rotation member 53 rotatable by contacting with the auxiliary wheels 30; a motor 54 configured to supply power to the rotation member 53; and a first member 51 connected with the rotation member 53 and the motor 54 and configured to selectively facilitate contact between the auxiliary wheels 30 and the rotation member 53 by vertically moving with respect to the body 10. The auxiliary wheels 30 may include a fixing member 31 forming a rotational axis of the auxiliary wheel and having a groove 311. The first member 51 may include a projection 511 inserted in the groove 311. Once the projection 511 is inserted in the groove 311, the auxiliary wheels 30 and the rotation member 53 may be aligned.

The rotational axis of the rear auxiliary wheel may be formed by the fixing member 31. The fixing member 31 may be freely rotatable with respect to the body 10 in a horizontal direction in the body 10 such that the auxiliary wheels 30 may be rotatable 360 degrees in a horizontal direction with respect to the body 10 during the running of the body 10.

As one example, the auxiliary wheel 30 is a kind of a caster. When the body 10 is running, the auxiliary wheels 30 may support front and rear sides of the body 10 and assist the rotation of the body 10 facilitated by the main wheels 40.

The motor 54, the rotation member 53 and the projection 511 may be connected to or formed in the first member 51. As the first member 51 is vertically moved with respect to the body 10, the projection 511 may be inserted in the groove 311 and the auxiliary wheels 30 may be aligned. Also, once contacting with the auxiliary wheels 30, the rotational member 53 may be rotated with engaging with the auxiliary wheels 30.

The fixing member 31 may further include a guide portion 313 having a slope towards the groove 311 from both sides of the fixing member 31. The projection 311 may be inserted in the groove 311 along the guide portion 313 to align the auxiliary wheels 30 and the rotation member 53 such that a rotational axis of the auxiliary wheel may be in parallel with a rotational axis of the rotation member 53.

The auxiliary wheels 30 may be aligned to rotate in the running direction of the body 10 by inserting the projection 511 in the groove 311. In other words, the rotational axis of the auxiliary wheel 30, the rotational axis of the rotation member 53 and the rotational axis of the main wheel 40 may be aligned to be in parallel.

The guide portion 313 may be tilted towards the groove 311 from front end sides of the fixing member 31 and configured to guide the projection 511 to be inserted in the groove 311. Also, as the projection 511 is inserted in the groove 311 along the guide portion 313, the auxiliary wheels 30 may be aligned.

The fixing member 31 may be rotatable in a horizontal direction of the body 10. It is necessary to align the auxiliary wheels to be in parallel with the rotational axis of the rotation member 53 so as to be supplied the rotational force of the rotation member by the auxiliary wheels 30 contacting with the rotation member 53, when the projection 511 is inserted in the groove 311. Accordingly, the projection 511 and the groove 311 may be smoothly coupled to each other by the guide portion 313 and the auxiliary wheels 30 may be aligned in the running direction of the body 10.

Meanwhile, the transmission may further include a second member 52 configured to contact with the first member 51 and vertically move the first member. The second member 52 may include a first contact portion 521 vertically moving with respect to the body 10. The first member 51 may be vertically movable with respect to the body 10 along the forward and backward movement of the first contact portion 521. More specifically, the first contact portion 521 may have a tilted surface and the first member 51 may include a second contact portion 512 forming a tilted surface that engages with the tilted surface of the first contact portion 521. When the first contact portion 521 moves forwards and backwards, the second contact portion 512 may vertically move along the tilted surface that is in contact with the first contact portion 521.

In addition, the second member 52 may further include a motor 523 configured to move the first contact portion 521 forwards and backwards.

FIG. 4 is a diagram illustrating an auxiliary wheel when the robot cleaner is running over and FIG. 5 is a side perspective view of FIG. 4. Hereinafter, the auxiliary wheels will be described referring to FIGS. 4 and 5.

As mentioned above, the transfer unit 50 may selectively transfer power to the rear auxiliary wheel 30. More specifically, the transfer unit 50 may be selectively coupled to the fixing member 31 to align the auxiliary wheels 30 in the running direction of the body 10 and the auxiliary wheels 30 may be rotated.

The transfer unit may include a first module and a second module. The first module may be vertically movable with respect to the body 10 and include the projection 511, the rotation member 53, the motor 54 and the first member 51.

The second module may be horizontally movable with respect to the body 10 and include the first contact portion 521 and the motor 523.

In other words, the first module may include the configuration for vertically moving and the configurations for supplying power to vertically move. The second module may include the configuration for horizontally moving with respect to the body 10 and the configuration for supplying power to horizontally move.

Specifically, the rear auxiliary wheel 30 may be supplied the power by the second module and the first module in order. As the first contact portion 521 of the second module is horizontally moved with respect to the body 10, the second contact portion 512 having the tilted surface that engages with the tilted surface of the first contact portion may be moved downwardly and the first member 51 of the first module may be moved downwardly.

As the first member 51 is moved downwardly, the projection 511 may be inserted in the groove 311 along the guide portion 311 and align the rotational axis of the rear auxiliary wheel 30 towards the running direction of the body 10. Once the projection 511 is inserted in the groove 311, the rotation member 53 may contact with the rear auxiliary wheel 30.

Also, once the rotation member 53 is rotated by means of the power generated by the motor 54, the rear auxiliary wheel 30 engaging with the rotation member 53 may be rotated together such that the body 10 may run over the tilted route or obstacle.

FIG. 6 is a diagram illustrating an auxiliary wheel power transfer module provided in the robot cleaner according to one embodiment. Hereinafter, the auxiliary wheel power transfer module will be described referring to FIG. 6.

As describing the power transfer process of the auxiliary wheels 30 by means of the transfer unit 50, the first contact portion 521 may be horizontally moved with respect to the body 10 by the motor 523.

The first contact portion 521 may form the tilted surface and the second contact portion 512 may form the tilted surface that engages with the tilted surface of the first contact unit 521, so as to downwardly move the second contact portion 512 while the first contact portion 521 is vertically moved.

While the second contact portion 512 formed in some area of the first member 51 is downwardly moved, the first member 51 may be also downwardly moved with respect to the body 10 and the projection 511 may be inserted in the groove 311 formed in the fixing member 31.

The projection 311 may align the rear auxiliary wheel 30 as inserted in the groove 31 along the guide portion 3113. Once the projection 511 I is inserted in the groove 311, the rotation member 53 may contact with the rear auxiliary wheel 30.

The rotation member 53 is rotated by the power transferred by the motor 54 such that the rear auxiliary wheel 30 contacting with the rotation member 53 may be rotated together.

The coupling between the first member 51 and the rear auxiliary wheel 30 may be released as the projection 511 is upwardly moved with respect to the body 10 along the guide portion 313 together with the rotation of the fixing member 31, after the motor 523 of the second member 52 and the motor 54 of the first member 51 are stopped.

Alternatively, although not drawn in the drawings, the first member 51 may be connected with a material having a preset elasticity in the body so as to give a position restoring force to the first member 51. Accordingly, once the drives of the motors 523 and 54 are stopped, the position of the first member 51 may be restored.

FIG. 7 is a diagram illustrating one example of climbing that is performed by the robot cleaner according to one embodiment. Hereinafter, the example will be described referring to FIG. 7.

When the body 10 is running on the tilted surface 3 having a preset slope from the floor 1, the front area of the body 10 may be in contact with the tilted surface 3 and a rear area of the body 10 may be in contact with the floor. In this instance, a center area of the body may be spaced a preset distance apart from the floor and the main wheels 40 can be separated from the main wheel mounting portion 41. As mentioned above, the main wheels 40 may have the variable height with respect to the body 10, different from the auxiliary wheels 20 and 30.

When the main wheels 40 are separated from the main wheel mounting portion 41, the main wheels 40 fail to contact with the floor sufficiently and generate a sufficient contact friction force to allow the body 10 to run over. In other words, the body 10 of the robot cleaner may have a preset length horizontally and the main wheels 40 may be provided in right and left center areas. The front and rear area of the robot cleaner may be located in the tilted surface 3 and the floor 1 in a tilted area. Also, the main wheels 40 may fall down in the tilted surface. Accordingly, the contact power between the mainwheels 40 and the floor becomes weak enough for the robot cleaner to climb up disadvantageously.

In this instance, the rear auxiliary wheel 30 contacting with the floor 1 may be rotated to allow the body 10 to run over.

Meanwhile, although not shown in the drawings, the conventional robot cleaner may include diverse sensors including a cliff sensor, a gyro-sensor, an obstacle sensor and the like. The transfer unit 50 may transfer the power to the rear auxiliary wheel, when determining that the body 10 is climbing over the tilted surface or obstacle based on the information collected by the sensors.

In addition, when the body is rotated or idling by an obstacle over which the body cannot climb up while transferring the power to the rear auxiliary wheel 30 to run the body 10 fast, the transfer unit 50 may transfer the power to the rear auxiliary wheel 30. When the body 10 runs, the body 10 may be separated from the rear auxiliary wheels 30. Also, the rear auxiliary wheel 30 may assist the rotation of the body 10.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A robot cleaner, comprising:
   a body;
   main wheels provided in the body to move or rotate the body;
   an auxiliary wheel provided in the body to support a front side of the body or a rear side of the body; and
   a transfer unit configured to supply power to the auxiliary wheel independently from the main wheels, wherein the auxiliary wheel is configured to rotate idly when the transfer unit does not contact the auxiliary wheel, and the auxiliary wheel is configured to rotate when the transfer unit contacts the auxiliary wheel, and wherein the transfer unit comprises:
   a rotation member configured to rotate the auxiliary wheel;
   a motor configured to provide power to the rotation member; and
   a first member connected with the rotation member and the motor and configured to selectively provide contact between the auxiliary wheel and the rotation member by moving with respect to the body vertically.

2. The robot cleaner of claim 1, wherein the auxiliary wheel comprises a fixing member having a rotational shaft of the auxiliary wheel and a groove, and wherein the first member comprises a projection configured to be inserted into the groove.

3. The robot cleaner of claim 2, wherein the fixing member further comprises a guide portion that forms a tilted surface towards the groove from both sides of the fixing member, and wherein the projection is inserted into the groove along the guide portion and aligns the auxiliary wheel and the rotation member in parallel with each other.

4. The robot cleaner of claim 1, wherein the transfer unit further comprises a second member that is configured to contact the first member and move the first member vertically.

5. The robot cleaner of claim 4, wherein the second member comprises a first contact member that moves horizontally with respect to the body, and wherein the first member is vertically moved with respect to the body along with the horizontal movement the first contact portion.

6. The robot cleaner of claim 5, wherein the first contact portion forms a tilted surface, and wherein the first member comprises a second contact portion that forms a tilted surface that engages with the tilted surface of the first contact portion.

7. A robot cleaner, comprising:
   a body;
   main wheels provided in the body to move or rotate the body;
   an auxiliary wheel provided in the body to support a front side of the body or a rear side of the body;
   a fixing member that forms a rotational axis of the auxiliary wheel and rotatable with respect to the body; and
   a transfer unit configured to supply power to the auxiliary wheel independently from the main wheels, wherein the auxiliary wheel aligns in a running direction of the body and rotates when the transfer unit is coupled to the fixing member, wherein the transfer unit comprises a first module vertically moved with respect to the body and comprising a projection, and wherein the fixing member comprises a guide portion having a groove having the projection inserted therein.

8. The robot cleaner of claim 7, wherein the guide portion forms a tilted surface towards the groove from both sides of the fixing member.

9. The robot cleaner of claim 8, wherein the first module is vertically moved with respect to the body, and as the projection is inserted in the groove along the tilted surface, the first module fixedly aligns the auxiliary wheels in a running direction of the body.

10. The robot cleaner of claim 8, wherein the first module comprises:

a rotation member configured to contact the auxiliary wheel;

a motor configured to provide the power to the rotation member; and a first member comprising the projection connected with the rotation member and the motor, and configured to be movable with respect to the body vertically.

11. The robot cleaner of claim 7, wherein the transfer unit further comprises a second module that contacts the first module and moves the first module vertically.

12. The robot cleaner of claim 11, wherein the second module is horizontally moved with respect to the body, and the first module is vertically moved with respect to the body along with the horizontal movement of the second module.

* * * * *